United States Patent
Tamai et al.

(10) Patent No.: US 8,942,566 B2
(45) Date of Patent: Jan. 27, 2015

(54) BANDWIDTH ALLOCATOR USING A SHARED GRANT TO SCHEDULE ALLOCATION GRANTS AND A METHOD THEREFOR

(75) Inventors: Hideaki Tamai, Saitama (JP); Akihiro Takahashi, Saitama (JP); Satoshi Furusawa, Chiba (JP); Akiya Suzuki, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 665 days.

(21) Appl. No.: 13/220,605

(22) Filed: Aug. 29, 2011

(65) Prior Publication Data

US 2012/0051752 A1    Mar. 1, 2012

(30) Foreign Application Priority Data

Aug. 30, 2010   (JP) ................................. 2010-192003

(51) Int. Cl.
*H04J 14/08*     (2006.01)
*H04Q 11/00*     (2006.01)
*H04B 10/00*     (2013.01)

(52) U.S. Cl.
CPC ..... *H04Q 11/0067* (2013.01); *H04J 2203/0069* (2013.01); *H04Q 2011/0064* (2013.01)

USPC .................................. 398/99; 398/98; 398/100

(58) Field of Classification Search
CPC .................................. H04J 3/16; H04J 3/1694
USPC ............................................... 398/98, 99, 100
See application file for complete search history.

(56) References Cited

U.S. PATENT DOCUMENTS

| 2004/0109689 A1* | 6/2004 | Song et al. .................... 398/69 |
| 2005/0041682 A1* | 2/2005 | Kramer ......................... 370/458 |
| 2007/0122151 A1 | 5/2007 | Watanabe |

OTHER PUBLICATIONS

"Technical Fundamentals Lecture [GE-PON Technology]", NTT Technical Journal, pp. 71-74, Aug. 2005.

* cited by examiner

*Primary Examiner* — Daniel Dobson
(74) *Attorney, Agent, or Firm* — Rabin & Berdo, P.C.

(57) ABSTRACT

A bandwidth allocator for communicating with communication terminals by transmitting and receiving data packets over a line having its communication bandwidth divided into periods of time of a predetermined length. The allocator includes a controller controlling allocation of the bandwidth by using allocation grants as the periods of time. The controller includes a scheduler scheduling the allocation grants so as to cause one allocation grant to partially overlap as a shared grant with another allocation grant adjacent to the one allocation grant. Thus, the bandwidth allocator can minimize allocation loss, otherwise caused by no allocation to an allocation grant, and improve the use efficiency of the bandwidth.

16 Claims, 13 Drawing Sheets

BANDWIDTH ALLOCATOR USING A SHARED GRANT TO SCHEDULE ALLOCATION GRANTS AND A METHOD THEREFOR

BACKGROUND OF THE INVENTION

1. Field of the Invention

The present invention relates to a bandwidth allocator, and more particularly to a bandwidth allocator for use in a telecommunications network such as a TDMA (Time Division Multiple Access) network. The present invention also relates to a method of allocating a bandwidth and a communication terminal therefor.

2. Description of the Background Art

With reference first to FIG. 15, a configuration of a general passive optical network (PON) will briefly be described which relies upon a TDM-PON (Time Division Multiplexing-PON) scheme as disclosed as a general background art in an article, "Technical Fundamentals Lecture [GE-PON Technology]", NTT Technical Journal, pp. 71-74, August 2005.

A PON system 910 includes an optical line terminal (OLT) 920 located in a central office, a plurality of optical network units (ONUs) 930a, 930b, 930c, . . . located in subscriber premises, and an optical splitter 940 connecting the OLT 920 with the ONUs 930a, 930b, 930c, . . . . Communication, or transmission, from the ONU 930 toward the OLT 920 may be referred to as upstream communication, or transmission. Communication, or transmission, in the direction opposite thereto may be referred to as downstream communication, or transmission. The ONUs, generally 930, are connected with the optical splitter 940 by respective optical communication lines 970. The optical splitter 940 is connected with the OLT by another optical communication line 980.

The upstream communication in the TDM-PON system is based upon the TDMA scheme. In the TDMA scheme, the OLT 920 manages timing at which the ONUs 930 are allowed for transmitting signals such as to prevent the signals from colliding with each other on the optical communication line 980 connecting the OLT 920 to the optical splitter 940. Such control with the TDMA is disclosed by U.S. patent application publication No. 2007/0122151 to Watanabe.

Hereinafter, giving a permission by the OLT 920 to the ONUs 930 to transmit an upstream signal in a period of time having a predetermined length will be referred to as "allocating a bandwidth (or a time slot)". A bandwidth allocated to the ONU 930 will be referred to as an "allocation grant". Thus, the bandwidth and the allocation grant are represented in time length to be allowed for transmission, and therefore the units of the bandwidth and allocation grant are time, for example, second. Additionally, the volume of information which an ONU 930 can transmit during an allocation grant allocated thereto may be referred to as "the size of an allocation grant" or "an allocation grant size". The unit of an allocation grant size is the amount of information such as byte.

FIG. 16 exemplarily shows how allocation grants are allocated to the ONUs by the OLT. In the figure, the ONUs 930a, 930b and 930c are allocated to allocation grants 950a, 950b and 950c, respectively. The sizes of the allocation grants 950a, 950b and 950c are indicated by $m_1$, $m_2$ and $m_3$, respectively.

In the scheduling shown in FIG. 16, the ONU 930a transmits a signal during the period of the allocation grant 950a. Next, the ONU 930b transmits a signal during the period of the allocation grant 950b. Following the transmission from the ONU 930b, the ONU 930c transmits a signal during the period of the allocation grant 950c. In order to prevent those signals from collision, the allocation grants 950a, 950b and 950c do not overlap with one another.

Allocation grants may be allocated specifically to each of the ONUs 930, or dynamically to each of the ONUs 930 according to the amount of an upstream transmission requested by the ONU 930.

FIG. 17 shows how the ONU 930a uses the allocation grant 950a allocated thereto to transmit an upstream signal. FIG. 17, line (A), shows how a data buffer temporarily stores upstream data to be transmitted from the ONU 930a. The upstream data are in the form of packets P1, P2, P3 and P4 having variable length. Line (B) shows the allocation grant size $m_1$ of the allocated allocation grant 950a. The allocation grant size $m_1$ is smaller than the total size of the data packets P1, P2, P3 and P4 in the data buffer.

The ONU 930a uses this allocation grant 950a to transmit the data packets P1 to P4 in the data buffer. It is understood that when the data packets are transmitted sequentially in the order from the data packet P1, the allocation grant size $m_1$ of the allocation grant 950a expires before completing the transmission of the last data packet P4. Then, the ONU 930a will transmit the data packet P4 next time.

In that case, actually the signal is transmitted as shown as FIG. 17, line (C), so that not all the allocated allocation grant 950a can be used up. A bandwidth, e.g. 985, successful in allocating an upstream data buffer is referred to as a used bandwidth, and an unused bandwidth, e.g. bandwidth 990, is referred to as allocation loss. When allocation loss is caused, the use efficiency of an upstream communication bandwidth decreases, which is problematic.

SUMMARY OF THE INVENTION

It is therefore an object of the present invention to provide a bandwidth allocator capable of minimizing allocation loss, i.e. failure to allocating an allocation grant. It is also an object of the invention to provide a method of allocating bandwidth with allocation loss minimized, and a communication terminal therefor.

In accordance with the present invention, a bandwidth allocator, for communicating with communication terminals by transmitting and receiving data packets over a communication line having its communication bandwidth divided into periods of time of a predetermined length, includes a controller controlling allocation of the bandwidth by using allocation grants as the periods of time. The controller comprises a scheduler scheduling the allocation grants so as to cause one of the allocation grants to partially overlap as a shared grant with another of the allocation grants which is adjacent to the one allocation grant.

In accordance with one aspect of the invention, a method of allocating a bandwidth in a bandwidth allocator for communicating with communication terminals by transmitting and receiving a data packet over a communication line having its communication bandwidth divided into periods of time of a predetermined length includes the steps of controlling allocation of the bandwidth of the line by using allocation grants as the periods of time; and scheduling the allocation grants so as to cause one of the allocation grants to partially overlap as a shared grant with another of the allocation grants which is adjacent to the one allocation grant.

In accordance with another aspect of the invention, a communication terminal for use in communicating with a bandwidth allocator, which controls bandwidth allocation of a communication line, by transmitting and receiving a data packet to and from the allocator over the communication line, which has its communication bandwidth divided into periods of time of a predetermined length, includes a communication controller receiving allocation grant information on an allocation grant which is any of the periods of time and which the bandwidth allocator allows the communication terminal to use the line, the allocation grant information including shared-grant information on a shared grant as a time period in which one of the allocation grants partially overlaps with another of the allocation grants which the bandwidth allocator allows to use the line; and an arranger arranging a data packet in a time period other than the shared grant in the allocation grant, and thereafter arranging a data packet in a time period of the shared grant.

In accordance with the present invention, allocation loss can be minimized, which would otherwise be caused by no allocation to an allocation grant. Therefore, in accordance with the present invention, the use efficiency of a communication bandwidth can improve.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
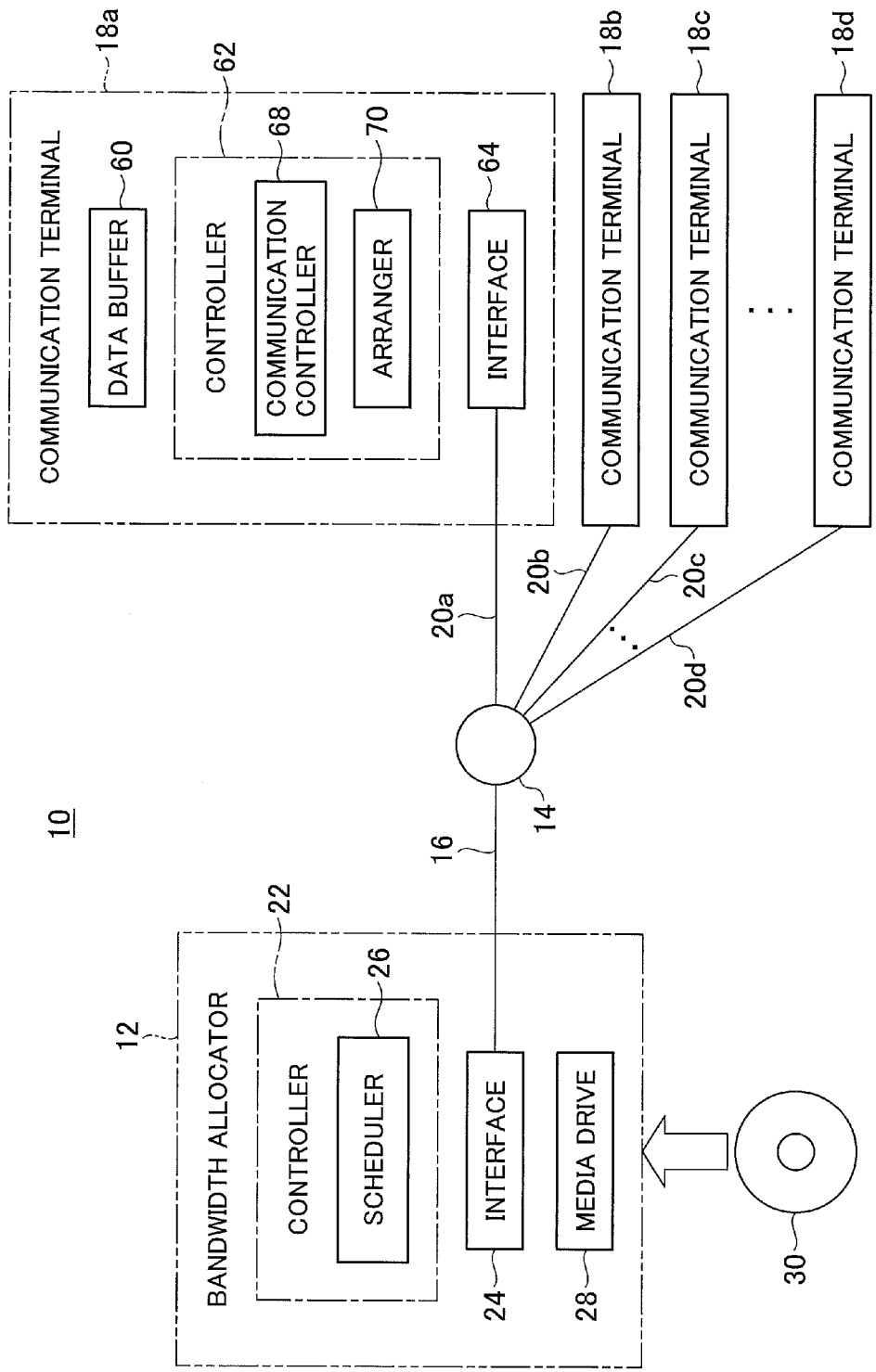
FIG. 1 is a schematic block diagram showing the configuration of a bandwidth allocating system in accordance with a preferred embodiment of the present invention.

Reference will be made to FIG. 1, which is a schematic block diagram showing the configuration of a bandwidth allocating system 10 to implement a preferred embodiment of the present invention. In the patent application, the bandwidth allocating system 10 is directed to a control system in which the TDMA (Time Division Multiple Access) scheme employed in upstream communication in a TDM-PON (Time Division Multiplexing-Passive Optical Network) system controls the bandwidth of an optical communication line 16. FIG. 1 schematically shows only the functional components for implementing the TDMA scheme in upstream communication. Since downstream communication is not directly relevant to understanding the present invention, FIG. 1 does not show functional elements for implementing the TDM scheme in downstream communication in the TDM-PON system, of which detailed description will be refrained from. The bandwidth allocation system 10 may thus be implemented as part of a telecommunications network such as TDM-PON.

The bandwidth allocating system 10 includes a bandwidth allocator 12 such as optical line terminal (OLT), an optical splitter 14 connected with the bandwidth allocator 12 by an optical communication line 16, and several communication terminals 18a, 18b, 18c, . . . , 18d, generally 18, connected with the optical splitter 14 by respective optical communication lines 20a, 20b, 20c, . . . , 20d, generally 20, such as optical network units (ONUS).

In the following description on the bandwidth allocating system 10, downstream signals may be described as being transmitted from the bandwidth allocator 12 to the communication terminals 18. This actually means that, for example, the bandwidth allocator 12 transmits a single downstream signal meant for all the communication terminals 18, and the optical splitter 14 splits the downstream signal into the same signals corresponding to the communication terminals to be transferred to the respective terminals 18.

Components and elements constituting the bandwidth allocating system 10 will be described below. In the bandwidth allocation system 10, there are several communication terminals 18a, 18b, . . . , 18d, which may be the same as each other. FIG. 1 merely depicts four communication terminals for illustration purpose. However, the bandwidth allocating system 10 may arbitrarily include any number of communication terminals 18.

The bandwidth allocator 12 is applied to ensure the TDMA scheme of use in upstream communication in the TDM-PON system. The bandwidth allocator 12 controls bandwidth allocation on the optical communication line 16 by specifying or allotting for the respective communication terminals 18 timings for transmitting signals over the optical communication line 20. The bandwidth allocator 12 includes a controller 22 for generally controlling the entire allocator 12, and an interface 24 for physically connecting, and interfacing with, the optical communication line 16 to the allocator 12.

The controller 22 includes a CPU (Central Processing Unit), peripheral circuits or devices therefor or the like, which are not shown in the figures. The controller 22 can perform program sequences to thereby implement its control function.

The controller 22 includes a scheduler 26 for scheduling allocation grants to be allocated to the communication terminals 18. More specifically, the scheduler 26 selects any two of the communication terminals 18 as a pair and arranges allocation grants to be allocated to those selected terminals 18 such that the allocation grants are adjacent to each other on the time axis. After that, the scheduler 26 schedules the allocation grants so as to provide a shared grant as a region in which the allocation grants partially overlap with each other.

The bandwidth allocator 12 may be a processor system, or computer. In such a case, the allocator 12 may include a media drive 28 for reading out programs stored in an external storage medium 30 such as a CD (Compact Disk), DVD (Digital Versatile Disk), magnetic disk, MO (Magneto-Optical Disk) and flash memory. The memory 30 can store programs to make the computer perform as the allocator 12 in accordance with the present invention. When the computer performs such programs, the method of the present invention can be executed.

The interface 24 is adapted for physically connecting, or interfacing, the optical communication line 16 with the allocator 12 to establish the PON system.

Figure 2:
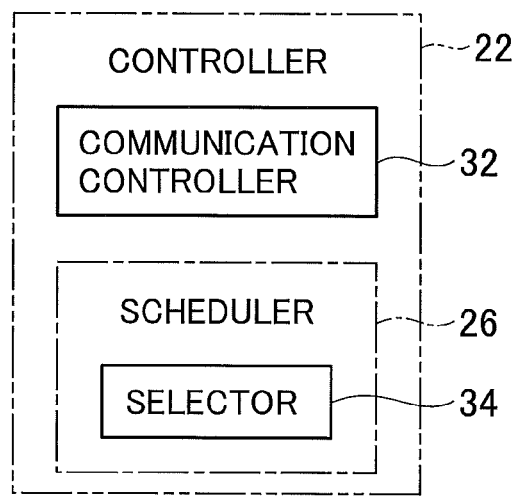
FIG. 2 is a schematic block diagram showing a more preferable configuration of the controller shown in FIG. 1.

Now, with reference to FIG. 2, an instantial constitution of the controller 22 will be described in more detail. The controller 22 includes a communication controller 32 for transmitting and receiving information for use in controlling the bandwidth on the optical communication line 16 through the interface 24 to and from the communication terminals 18. More specifically, the communication controller 32 is adapted for controlling the PON-type interface 24 to thereby transmit to, and receive from, the communication terminals 18 various types of information according to IEEE (Institute of Electrical and Electronic Engineers) 802.3ah standard (GE (Gigabit Ethernet)-PON) for applying high-speed broadband Ethernet (trademark) communication to an access network.

The illustrative embodiment can be widely applied to, in addition to IEEE802.3ah, a TDMA-type PON such as IEEE802.3av (10GE-PON).

The communication controller 32 can receive a REPORT message from the communication terminal 18. In the REPORT message, the data volume or size of data packets P is recorded, which are stored in a data buffer 60, described later on, of the terminal 18 and waiting for upstream transmission.

The communication controller 32 may transmit a GATE message to the communication terminal 18. In the GATE message, the allocation grant to be allocated to the terminal 18 is recorded to include the start time of transmission and a period of transmittable time.

The GATE message records information on whether an overlapping region shared by the allocation grants adjacent to each other, i.e. shared grant, is located in the top or last time period of the allocation grant. That is to say, the GATE message records shared-grant information. The shared grant will be described in detail later on. In this illustrative embodiment, the start time of transmission, the period of transmittable time and the shared-grant information are included in allocation grant information.

The communication controller 32 supplies the scheduler 26 with information on the data volume of the data packets P waiting for upstream transmission in the communication terminal 18 and recorded in the REPORT message. The scheduler 26 uses the information on the data volume of the data packets P to schedule an allocation grant to be allocated to the terminal 18.

The scheduler 26 may include a selector 34 for arbitrarily selecting two of the communication terminals 18 as a pair of terminals when scheduling the allocation grants.

The selector 34 in accordance with the instant embodiment may exempt the communication terminal 18 having an allocation grant allocated, which corresponds to the data volume of the data packets P required for transmission, from the terminals capable of being chosen. In that case, the selector 34 may select a pair of terminals 18 among the terminals 18 having an allocation grant not allocated, which corresponds to the required data volume of the data packets P.

Figure 3:
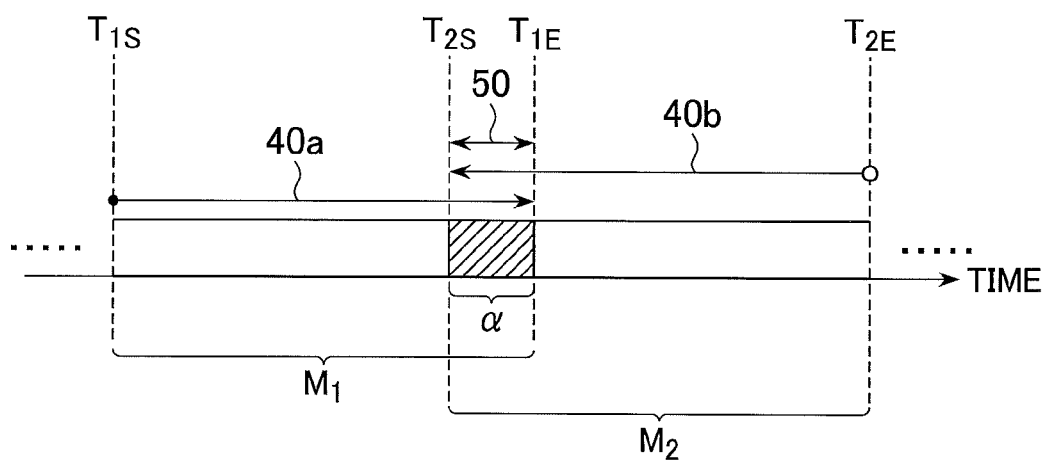
FIG. 3 is a schematic time chart useful for understanding a process for scheduling allocation grants by the bandwidth allocator in accordance with the preferred embodiment shown in FIG. 1.

FIG. 3 is a schematic time chart useful for understanding how the bandwidth allocator 12 schedules allocation grants. Only for illustration, it is assumed that the selector 34 selects the communication terminals 18a and 18b as a pair of terminals.

In FIG. 3, an allocation grant allocated to the one terminal 18a is indicated by a reference numeral 40a. Communication of the allocation grant 40a starts at time $T_{1S}$, and finishes at time $T_{1E}$. The size of the allocation grant 40a is indicated by a reference letter $M_1$. Similarly, an allocation grant allocated to the other terminal 18b is indicated by a reference numeral 40b. Communication of the allocation grant 40b starts at time $T_{2S}$, and finishes at time $T_{2E}$. The size of the allocation grant 40b is indicated by a reference letter $M_2$.

Further in FIG. 3, the arrows 40a and 40b of the allocation grants 40a and 40b indicate the directions in which the communication terminal 30 arranges the data packets. Details thereon will be described later on.

In FIG. 3, a shared grant, i.e. a time period in which the adjacent allocation grants 40a and 40b overlap with each other, is indicated by a reference numeral 50. The size of the shared grant 50 is indicated by a shaded section a in the figure. The time period in which the shared grant 50 exists takes the last temporal part of the one allocation grant 40a, and at the same time the top temporal part of the other allocation grant 40b.

In scheduling shown in FIG. 3, the communication terminal 18a transmits a signal during a period of the allocation grant 40a. Next, the communication terminal 18b transmits a signal during a period of the allocation grant 40b.

In the shared grant 50, both the communication terminals 18a and 18b selected as the pair are able to transmit data to the allocator 12. However, in the event that a collision of data to be transmitted occurs in the shared grant 50, at least a portion of the transmitting data may be lost to cause an error. When a collision occurs, therefore, the data will be transmitted again.

The scheduler 26 supplies the communication controller 32 with information on the start time of transmission $T_{1S}$ and $T_{2S}$, periods of transmittable time ($T_{1E}$ minus $T_{1S}$) and ($T_{2E}$ minus $T_{2S}$) of the scheduled allocation grants 40a and 40b, respectively, and information about the shared grant 50.

The communication controller 32 records the start time of transmission $T_{1S}$ and $T_{2S}$, the periods of transmittable time ($T_{1E}$ minus $T_{1S}$) and ($T_{2E}$ minus $T_{2S}$), and the information on the shared grant 50 in a GATE message, and then transmits the GATE message to the communication terminals 18a and 18b.

Although not shown in FIG. 3, the scheduler 26 makes a schedule for the communication terminals 18a, 18b, . . . , 18n from which it has actually received REPORT messages, and transmits appropriate GATE messages to the terminals 18a, 18b, . . . , 18n on which it has scheduled.

Returning to FIG. 1, the bandwidth allocator 12 is connected with the optical communication line 16, which includes, for example, an optical fiber and work as a transmission path of optical communication.

Through the optical communication line 16, the bandwidth allocator 12 is further connected with the optical splitter 14. The splitter 14 is adapted to split the light beam conveyed on the single-core optical communication line 16 into components to be transmitted over the plurality of optical communication lines 20.

The splitter 14 is connected with the optical communication lines 20. The lines 20 each include, for example, an optical fiber and work as a transmission path of optical communication to perform communication between the bandwidth allocator 12 and the communication terminals 18.

The communication terminals 18, which are connected with the bandwidth allocator 12 by the respective optical communication lines 16, the optical splitter 14 and the optical communication line 20, will now be described in detail. The communication terminal 18 is a control device for controlling, in the TDMA scheme for use in upstream communication in the TDM-PON system, the bandwidth on the optical communication line 16 by transmitting a signal at a timing designated by the allocator 12. The communication terminal 18 is configured to include a data buffer 60, a controller 62 and an interface 64.

The data buffer 60 is established by a certain storage area in a memory, not shown, forming a processor system in the terminal 18 and has a queue structure. As seen from FIG. 4, the data buffer 60 receives data packets Pa to be transmitted from a user terminal 66, which is connected to the communication terminal 18 by a communication line 68 and directly operable by the user to perform network communications, and stores the data packets Pa in the order of arrival.

Figure 4:
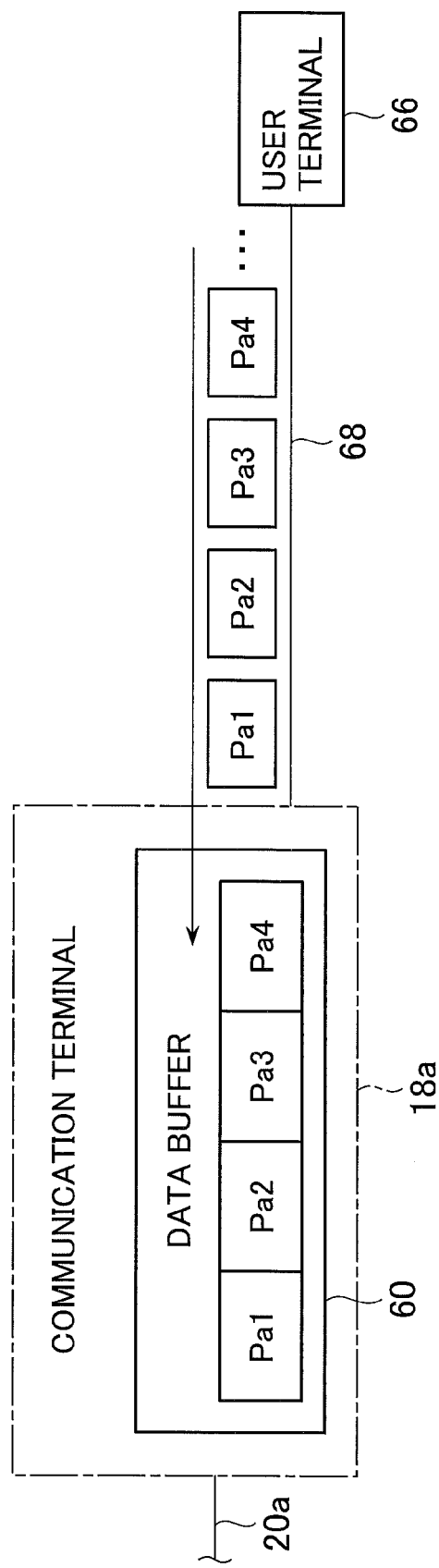
FIG. 4 schematically shows a process of storing data packets in the communication terminal shown in FIG. 1.

As shown in FIG. 4, the data packets P, when supplied to the communication terminal 18a, arrive in the order of packets Pa1, Pa2, Pa3 and Pa4, and are then stored in the data buffer 60a in the order of arrival. Similarly, in the communication terminals 18b, 18c ... 18n, the data packets P are stored in the data buffer 60 of each terminal 18 in the order of arrival.

The controller 62 includes a CPU and peripheral circuits therefor or the like, although not shown. In the communication terminal 18, at least the controller 62 may be implemented by a computer, which can execute programs for making the computer function as the terminal 18.

The controller 62 specifically includes a communication controller 68 for transmitting to, and receiving from, the bandwidth allocator 12 information for use in controlling the bandwidth of the optical communication line 16. More specifically, the communication controller 68 transmits to and receives from the bandwidth allocator 12 various types of information according to IEEE802.3ah standard for applying high-speed broadband Ethernet (trademark) communication to an access network.

The illustrative embodiment may widely be applied to, in addition or alternatively to IEEE802.3ah (GE-PON), a TDMA-type PON such as IEEE802.3av (10GE-PON). That is to say, the controller 68 is a device for controlling a PON-type interface.

For example, the communication controller 68 transmits a REPORT message to the bandwidth allocator 12. In the REPORT message, the data volume of data packets P is recorded, which are stored in the data buffer 60 and wait for upstream transmission.

The communication controller 68 receives a GATE message from the bandwidth allocator 12. In the GATE message, an allocation grant including a timing for transmitting data packets P stored in the data buffer 60 to the optical communication line 16 is recorded as the start time of transmission, the period of transmittable time, and the shared-grant information. The start time of transmission, the period of transmittable time and the shared-grant information in the instant embodiment are included in allocation grant information.

The controller 62 further includes an arranger 70 for arranging data packets. The arranger 70 acquires from the communication controller 68 allocation grant information recorded in a GATE message and then arranges in the allocation grant the data packets P stored in the data buffer 60.

Figure 5:
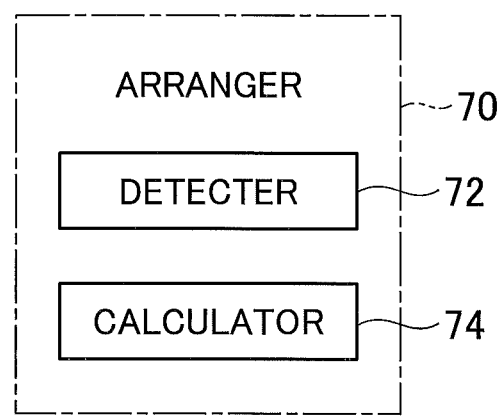
FIG. 5 is a schematic block diagram showing a more preferable configuration of the arranger shown in FIG. 1.

As shown in FIG. 5, the arranger 70 may include a detector 72 for detecting shared-grant information in a GATE message supplied from the bandwidth allocator 12. According to the detector 72, the controller 62 can determine whether the shared grant 50 is positioned in the top or last time period of the allocation grant 40.

As can be seen from FIG. 5, the arranger 70 may also include a calculator 74 for calculating the size M of an allocation grant, the period of transmission time required for transmitting data packets that can be arranged in the allocation grant of the calculated size M, and a period of difference time obtained by subtracting the calculated period of transmission time from the period of transmittable time recorded in the GATE message.

Figure 6A:
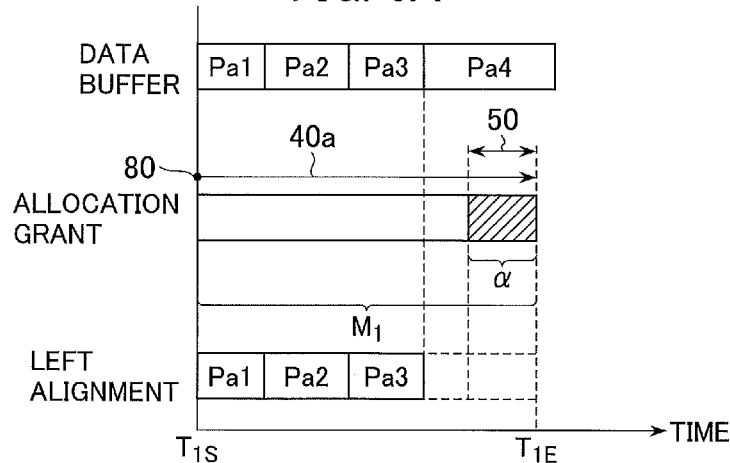
FIGS. 6A, 6B and 6C are schematic time charts useful for understanding a process for arranging data packets by the communication terminal in accordance with the preferred embodiment.
Figure 6B:
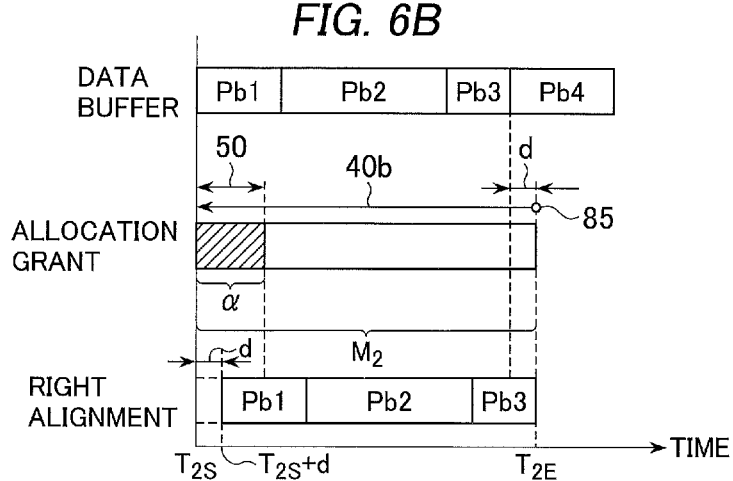
Figure 6C:
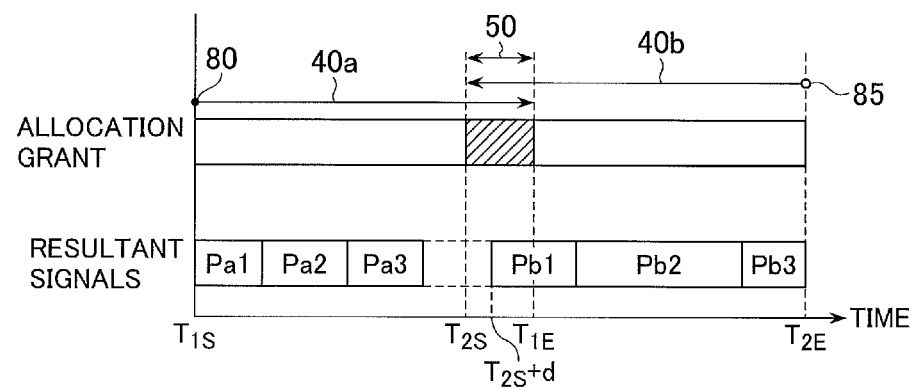

Now with reference to FIGS. 6A, 6B and 6C, it will conceptually be described how the arranger 70 arranges data packets. In FIGS. 6A, 6B and 6C, the allocation grants 40a and 40b for the pair of communication terminals 18a and 18b, respectively, are scheduled in the order from the left on the time axis in the figures by the scheduler 26 in the allocator 12. When the allocation grant 40a is scheduled at the left on the time axis by the scheduler 26, the arranger 70 in the terminal 18a arranges upstream data to be transmitted closely from the leftmost on the time axis. Hereinafter, such an arrangement for an upstream signal is referred to as "left alignment". The starting point, indicated by a dot 80, of an arrow indicating the allocation grant 40a in FIG. 6A located leftmost of the allocation grant 40a represents that the upstream data are arranged in the left alignment.

On the contrary, when the allocation grant 40b is scheduled at the right on the time axis by the scheduler 26, the arranger 70 in the communication terminal 18b arranges upstream data to be transmitted closely from the rightmost on the time axis. Hereinafter, such an arrangement for an upstream signal is referred to as "right alignment". The starting point, indicated by a circle 85, of an arrow indicating the allocation grant 40b in FIG. 6B located rightmost of the allocation grant 40b represents that the upstream data to be transmitted are arranged in the right alignment.

FIGS. 6A, 6B and 6C are schematic time charts useful for understanding a process for arranging the data packets P by the communication terminals 18. FIGS. 6A, 6B and 6C illustrate processes in the left alignment, the right alignment and a resultant upstream signal to be transmitted, respectively. An example of process performed by the arranger 70 will be described with reference to those figures.

After the detector 72 in the arranger 70 detects shared-grant information recorded in a GATE message, the arranger 70 determines whether data are arranged in the "left alignment" or the "right alignment". More specifically, when the shared grant 50 is located in the last time period of the allocation grant 40a, the arranger 70 will proceed to the left alignment shown in FIG. 6A. On the contrary, when the shared grant 50 is located in the top time period of the allocation grant 40b, the arranger 70 will proceed to the right alignment shown in FIG. 6B.

As shown in FIG. 6A, for example, in the communication terminal 18a, the calculator 74, included in the arranger 70, multiplies the transmission rate of the optical communication line 16 by the period of transmittable time recorded in the GATE message to thereby calculate an allocation grant size $M_1$. After that, the arranger 70 arranges the data packets Pa in the allocation grant of the calculated size $M_1$ as many as possible from the transmission start time $T_{1S}$.

In the instant example, the allocation grant size $M_1$ is larger than the total of the data packets Pa1, Pa2 and Pa3 and smaller than the total of the data packets Pa1, Pa2, Pa3 and Pa4. Thus, the arranger 70 has arranged the data packets Pa1, Pa2 and Pa3 in the left alignment.

In case of the right alignment, as shown in FIG. 5B, the calculator 74 included in the communication terminal 30b multiplies the transmission rate of the optical communication line 16 by the period of transmittable time recorded in the GATE message to thereby calculate an allocation grant size $M_2$. Next, the calculator 74 calculates a period of time required for transmitting the data packets Pb that can be arranged in the allocation grant of the calculated size $M_2$. The calculator 74 further proceeds to subtracting the calculated period of transmission time from the periods of transmittable time recorded in the GATE message to thereby calculate a period of difference time d. Then, the arranger 70 arranges in the allocation grant of the calculated size $M_2$ the data packets Pb from a time obtained by adding the calculated period of difference time d over the transmittable start time $T_{2S}$.

In the present example, the allocation grant size $M_2$ is larger than the total of the data packets Pb1, Pb2 and Pb3 and smaller than that of the data packets Pb1, Pb2, Pb3 and Pb4. Thus, the arranger 70 arranges the data packets Pb1, Pb2 and Pb3 in the right alignment.

FIG. 6C illustrates communication signals to be transmitted from the communication terminals 18a and 18b, that is to say, resultant upstream signals flowing over the optical communication line 16.

Referring to FIG. 1 again, the interface 64 in the communication terminal 18 is adapted to physically connect the optical communication line 20 with the communication terminal 18 to accomplish the PON.

The bandwidth allocating system 10, in particular the bandwidth allocator 12 and the communication terminals 18 are thus configured in accordance with the illustrative embodiment.

Figure 7:
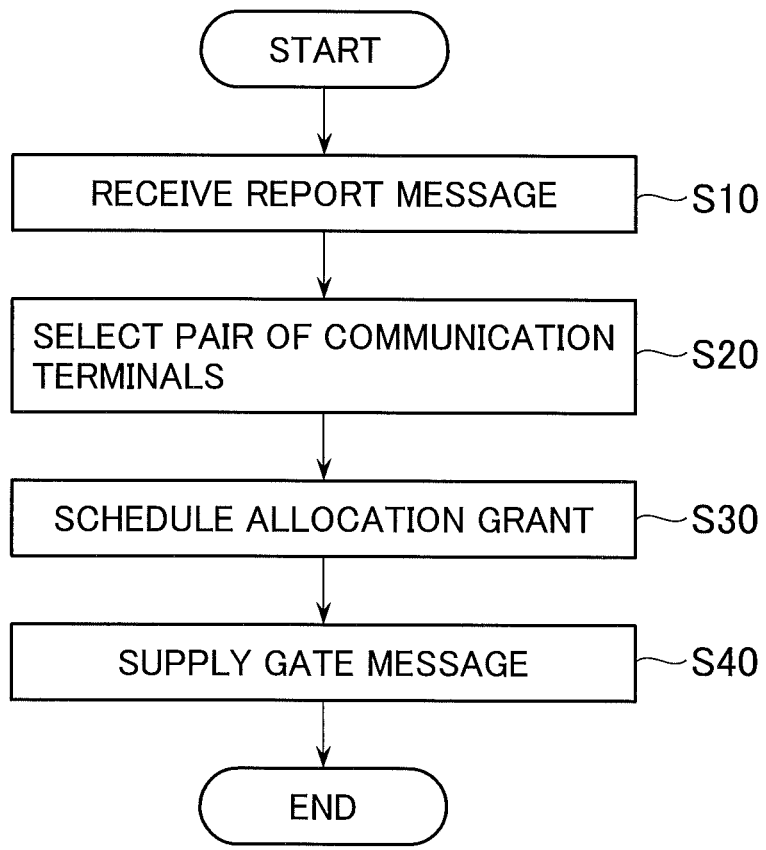
FIG. 7 is a flowchart useful for understanding the operation for scheduling allocation grants by the bandwidth allocator in accordance with the preferred embodiment.
Figure 8:
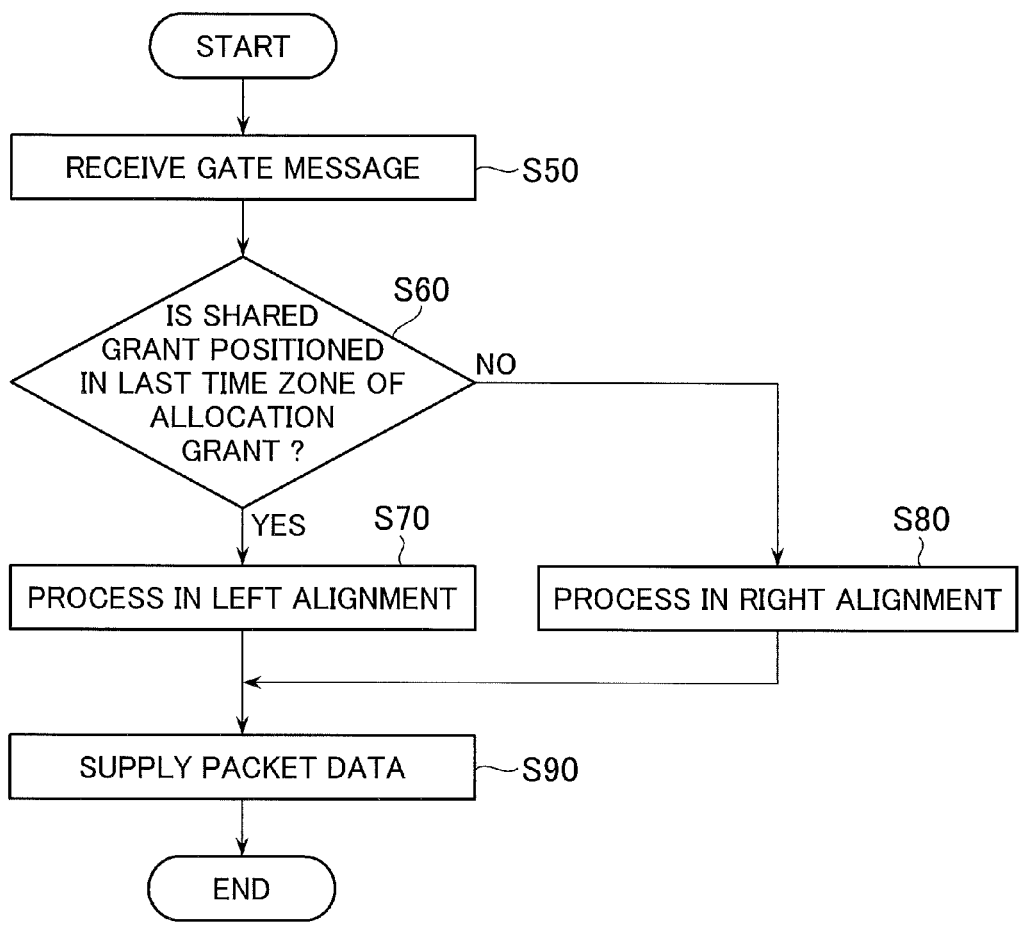
FIG. 8 is a flowchart useful for understanding the operation for arranging data packets by the communication terminal in accordance with the embodiment.

Reference will be made to FIGS. 7 and 8 to describe the operation of the bandwidth allocating system 10 in accordance with the illustrative embodiment. First, with reference to FIG. 7, the operation for scheduling the allocation grant 40 by the bandwidth allocator 12 will be described. Next, with reference to FIG. 8, the operation for arranging data packets by the communication terminal 18 will be described.

FIG. 7 is a flowchart useful for understanding the operation for scheduling allocation grants by the bandwidth allocator 12. First, the communication controller 32 receives a REPORT message from the communication terminal 18 (step S10).

Next, the scheduler 26, more specifically the selector 34, selects as a pair any two of the communication terminals 18 having received the REPORT message in step S10 (step S20). Now, the selector 34 selects one of the terminals of the selected pair as a priority terminal 18a communicating prior to the other and the other of the terminals 18 as a less priority terminal 18b which will communicate next to the priority terminal 18a. As described earlier, the selector 34 may select a pair of terminals 18 so as not to select a terminal 18 which cannot have an allocation grant 40 allocated which corresponds to the data volume of data packets P required for communication.

Next, the scheduler 26 schedules the allocation grant 40 so as to cause the last time period of the allocation grant 40a to be allocated to the priority terminal 18a to overlap as a shared grant 50 with the top time period of the allocation grant 40b to be allocated to the less priority terminal 18b (step S30). That is to say, the allocation grant 40a partially overlaps with the allocation grant 40b adjacent to the allocation grant 40a.

Next, the communication controller 32 records in a GATE message information on the allocation grant 40 scheduled in step S30, and then supplies the GATE message to the communication terminals 18 (step S40). The allocation grants 40 have thus been scheduled by the bandwidth allocator 12.

Subsequently, the operation for arranging data packets by the communication terminal 18 will be described below with reference to the flowchart in FIG. 8. First, the communication controller 68 included in the communication terminal 18 receives the GATE message (see step S40 in FIG. 7) from the bandwidth allocator 12 (step S50).

Next, the detector 72 in the arranger 70 analyzes the allocation grant information recorded in the GATE message received in the step S50, and then determines whether or not the shared grant 50 is positioned in the last time period of the allocation grant 40 (step S60).

When the shared grant 50 is determined to be positioned in the last time period of the allocation grant 40 ("Yes" in step S60), the process progresses to step S70. Otherwise, i.e. when the shared grant 50 is not determined to be positioned in the last time period of the allocation grant 40 ("No" in step S80), then the process progresses to step S80.

In the case of "Yes" in step S60, the arranger 70 proceeds to the left alignment step S70 for arranging in the allocation grant 40 the data packets P stored in the data buffer 60 in the left alignment. The process then progresses to step S90.

In the case of "No" in the S60, the arranger 70 proceeds to the right alignment step S80 for arranging in the allocation grant 40 the data packets P stored in the data buffer 60 in the right alignment. The process then progresses to step S90.

Next, the communication controller 68 in the terminal 18 forwards in step S90 the data packets P to the optical communication line 16 according to the arrangement of the data packets P thus processed in the left alignment in the step S70 or in the right alignment in step S80. The data packets P have thus been arranged by the communication terminal 18.

An example of advantages caused by the present embodiment will be described with reference again to FIG. 3. Preconditions, computation expressions and the result of calculations described below are merely an example, and are changeable depending on operation environment.

The lower and upper limits of the size of upstream data packets including upstream transmitting data are represented by Pmin and Pmax [byte], respectively. Upstream data packets are assumed to be uniformly distributed in size from Pmin to Pmax. Additionally, a probability at which an allocation loss will be equal to x [byte] after upstream data packets are closely set into the allocation grant 40 of N [byte] is represented by P(N, x).

The expectation value $X(\alpha)$ [byte] of the sum of the sizes of the upstream data to be transmitted from the communication terminals 18a and 18b is represented by the following expression:

$$X(\alpha) = \sum_{z=\alpha}^{z_{max}} Q(z) \cdot (M_1 + M_2 - z) \tag{1}$$

where the size of the allocation grant 40*a* is $M_1$ [byte], the size of the allocation grant 40*b* is $M_2$ [byte], and the size of the shared grant 50 is $\alpha$ [byte].

However, it is assumed that, when the upstream transmitting data collide with each other in the shared grant 50, both of the data packets are lost. Additionally, z is equal to x+y, where x and y represent the allocation losses for the communication terminals 18*a* and 18*b*, respectively. The term Q(z) represents a probability at which the sum of the allocation losses for the terminals 18*a* and 18*b* is equal to z, and is represented by the following expression:

$$Q(z) = \sum^{x+y=z} P(M_1, x) \cdot P(M_2, y) \qquad (2)$$

The summation $\Sigma$ in the above expression (2) represents an addition for all combinations of x and y satisfying x+y=z.

In order to evaluate the bandwidth usability, an evaluation expression Eff($\alpha$) is defined by the following expression:

$$\mathit{Eff}(\alpha) = X(\alpha)/(M_1 + M_2 - \alpha) \qquad (3)$$

Figure 9:
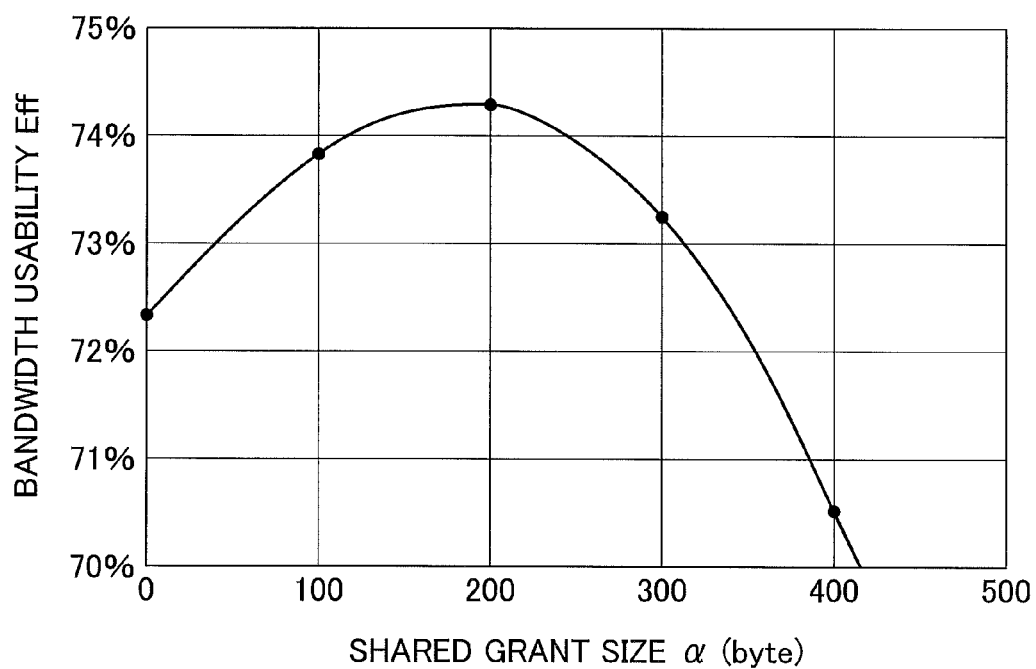
FIG. 9 is a graph plotting an example of bandwidth use efficiency by the bandwidth allocating system in accordance with the embodiment.

A result of calculation of Eff($\alpha$) where Pmin is equal to 64 [byte], Pmax to 1522 [byte], and both $M_1$ and $M_2$ to 1622 [byte] is plotted in FIG. 9. It is understood that, when the shared grant size $\alpha$ is properly selected, the bandwidth usability is improved from the conventional example ($\alpha$=0 [byte]).

In short, in the bandwidth allocating system 10 in accordance with the illustrative embodiment, the bandwidth allocator 12 schedules the allocation grant 40 so as to set as a shared grant 50 either the top or last time period of the allocation grant 40 to overlap with its adjacent allocation grant, thereby minimizing allocation loss which would otherwise be caused as an unused bandwidth. Therefore, the bandwidth allocating system 10 in accordance with the embodiment can improve the bandwidth usability of the communication bandwidth of the optical communication line 16.

In the bandwidth allocating system 10 in accordance with the illustrative embodiment shown in and described with reference to FIG. 1, the bandwidth allocator 12 is thus adapted to schedule the allocation grant 40 so as to set as a shared grant 50 either the top or last time period of the allocation grant 40 to overlap with its adjacent allocation grant. In the bandwidth allocating system 10 of an alternative embodiment which will be described below, the scheduler 26 in the bandwidth allocator 12 is adapted to schedule the allocation grant 40 so as to set as a shared grant 50 both the top and last time periods of the allocation grant 40 to overlap with its adjacent allocation grant, thereby improving the bandwidth usability of the optical communication line 16.

In schematic block diagrammatic view, the essential constitution of the bandwidth allocating system 10 in accordance with the alternative embodiment may be the same as the illustrative embodiment shown in FIG. 1. Hence, the alternative embodiment will be described still with reference to FIG. 1.

Figure 10:
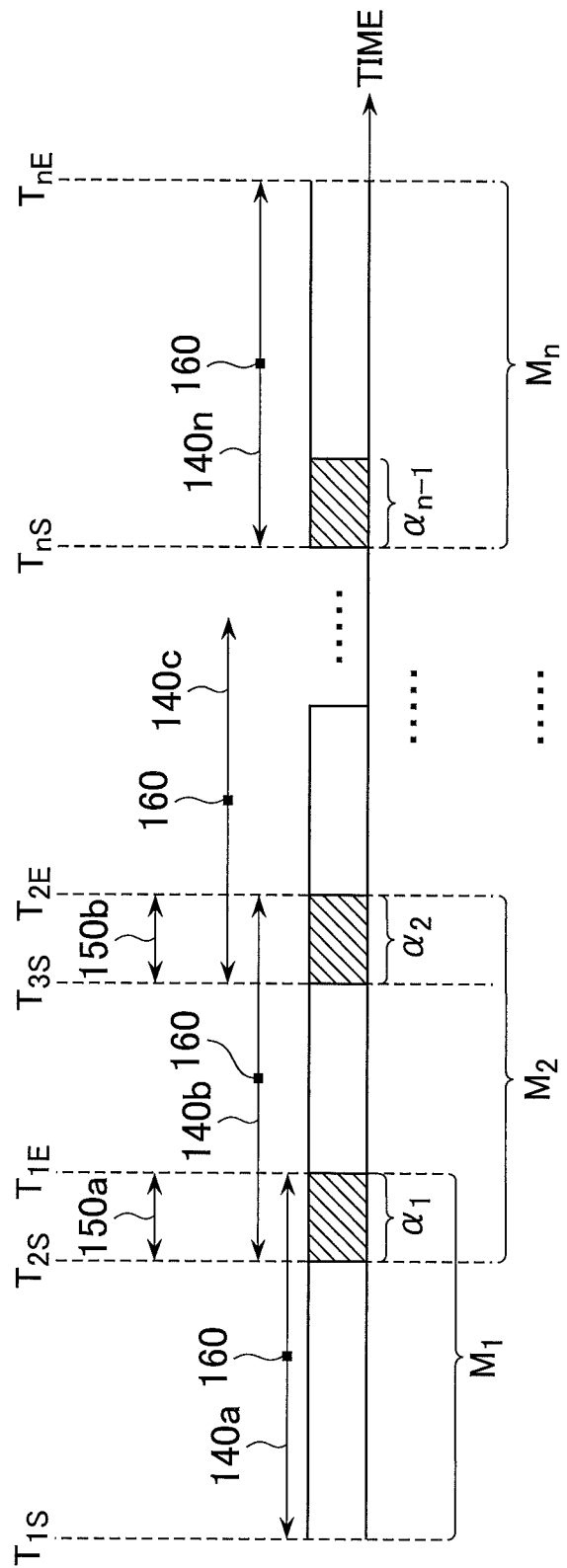
FIG. 10 is a schematic time chart, like FIG. 3, useful for understanding a process for scheduling allocation grants by the bandwidth allocator in accordance with an alternative embodiment of the present invention.

The process performed by the scheduler 26 in this alternative embodiment will be described in detail below with reference first to FIG. 10, which is a schematic time chart useful for understanding a process for scheduling allocation grants 140 by the bandwidth allocator 12. In FIG. 10, it is assumed that for a plurality n of terminals 18, where n is a natural number, a corresponding plurality n of allocation grants 140 are scheduled.

The scheduler 26 receives from the communication controller 32 information on the data volume of data packets P waiting for upstream transmission in a communication terminal 18 recorded in a REPORT message, and then schedules an allocation grant 140 to be allocated to that terminal 18.

The selector 34 in the scheduler 26 selects three of the communication terminals 18 in charge of transmitting the data packets P. The scheduler 26 arranges allocation grants 140 to be allocated to the selected communication terminals 18 in line on the time axis, and thus schedules the allocation grants 140 so as to provide a shared grant 150 as a region in which the adjacent allocation grants partially overlap with each other.

In FIG. 10, an allocation grant allocated to the communication terminal 18*a* is indicated by a reference numeral 140*a*. The start and the finish time of a transmission time period of the allocation grant 140*a* are indicated by reference letters $T_{1S}$ and $T_{1E}$, respectively. The size of the allocation grant 140*a* is indicated by $M_1$. Similarly, an allocation grant allocated to the communication terminal 18*b* is indicated by a reference numeral 140*b*. The start and the finish time of a transmission time period of the allocation grant 140*b* are indicated by reference letters $T_{2S}$ and $T_{2E}$, respectively. The size of the allocation grant 140*b* is indicated by $M_2$. An allocation grant allocated to the communication terminal 18*c* is indicated by a reference numeral 140*c*. The start time of a transmission time period of the allocation grant 140*c* is indicated by a reference letter $T_{3S}$, respectively.

In FIG. 10, the arrows of the allocation grants 140 indicate the directions in which the arranger 70 arranges the data packets P. Details thereon will be described later.

Further in FIG. 10, a shared grant as a time period in which the adjacent allocation grants 140*a* and 140*b* overlap with each other is indicated by a reference numeral 150*a*. The size of the shared grant 150*a* is indicated by a shaded section $\alpha_1$ in the figure. Likewise, a shared grant as a time period in which the adjacent allocation grants 140*b* and 140*c* overlap with each other is indicated by a reference numeral 150*b*. The size of the shared grant 150*b* is indicated by a shaded section $\alpha_2$.

The time period in which the shared grant 150*a* exists takes the last temporal part of the one allocation grant 140*a*, and at the same time the top temporal part of the other allocation grant 140*b*. The time period in which the shared grant 150*b* exists takes the last temporal part of the other allocation grant 140*b*, and at the same time the top temporal part of the still other allocation grant 140*c*.

In scheduling shown in FIG. 10, the communication terminal 18*a* transmits a signal during a period of the allocation grant 140*a*. Next, the communication terminal 18*b* transmits a signal during a period of the allocation grant 140*b*. After that, the communication terminal 18*c* transmits a signal during a period of the allocation grant 140*c*.

In the shared grant 150*a*, both the communication terminals 18*a* and 18*b* can transmit data. In the shared grant 150*b*, both the terminals 18*b* and 18*c* are able to transmit data. In the event that a collision of data packets to be transmitted occurs in the shared grant 150, some or all of the impinging data packets may be lost. When a collision occurs, therefore, transmission of the data will be tried again.

The scheduler 26 delivers to the communication controller 32 information on the start time of transmission $T_{1S}$, $T_{2S}$, $T_{3S}$, ..., $T_{nS}$ and periods of transmittable time $(T_{1E}-T_{1S})$, $(T_{2E}-T_{2S})$, $(T_{3E}-T_{3S})$, ..., $(T_{nE}-T_{nS})$ of the scheduled allocation grants 140*a*, 140*b*, 140*c*, ..., 140*n*, respectively. The communication controller 32 records in a GATE message the delivered start time of transmission and the periods of transmittable time, and transmits the GATE message to the respective communication terminals 18*a*, 18*b*, 18*c*, ..., 18*n*. With the instant alternative embodiment also, the start time of transmission, the period of transmittable time and the shared-grant information are included in allocation grant information.

Next, further with reference to FIG. 10, it will conceptually be described how the arranger 70 arranges data packets in this alternative embodiment. In the figure, allocation grants 140 to be allocated to the communication terminals 18 are arranged in line on the time axis, and scheduled so as to provide the shared grants 150 as regions in which the adjacent allocation grants 140 partially overlap with each other.

The arranger 70 arranges upstream data to be transmitted closely from the center on the time axis. Namely, upstream data are so arranged that, when an allocation loss is caused, unused regions will be positioned evenly at the leftmost and the rightmost of the allocation grant 140. Such an arrangement for an upstream signal is referred to as "center alignment". The starting point, indicated by a black square 160, of an arrow indicating the allocation grant 150 in FIG. 10 located at the center of the allocation grant 150 represents that the upstream data to be transmitted are arranged in the center alignment.

Figure 11A:
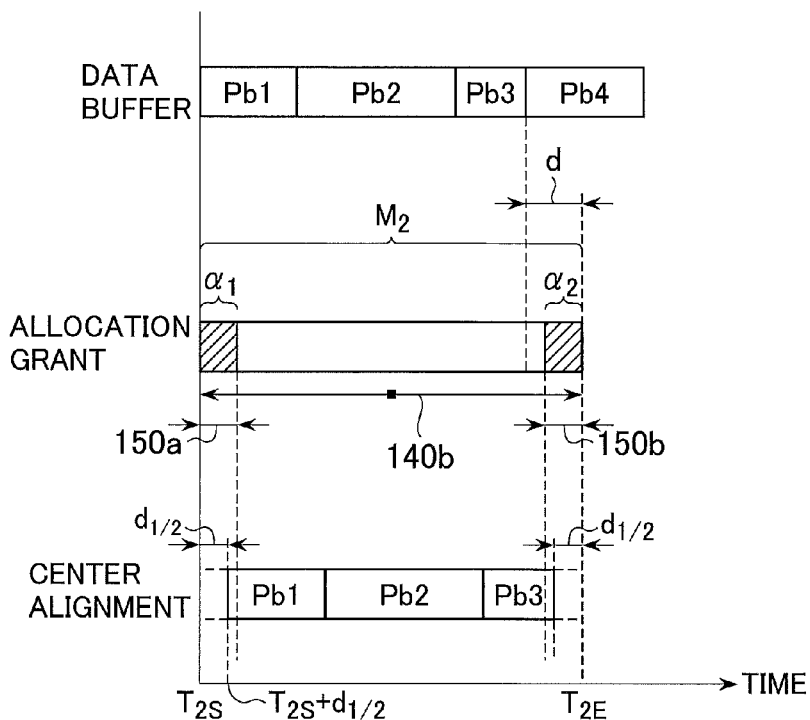
FIGS. 11A and 11B are schematic time charts, like FIG. 6A or 6B and 6C useful for understanding a process for arranging data packets by the communication terminal in accordance with the alternative embodiment.
Figure 11B:
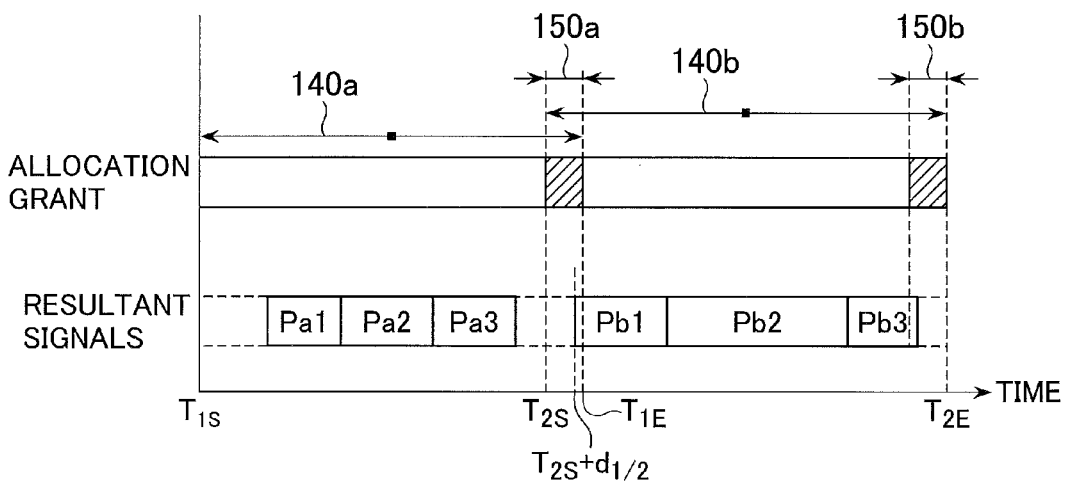

Reference will be made to FIGS. 11A and 11B, which are schematic time charts useful for understanding a process for arranging data packets P by the communication terminal 18. FIGS. 11A and 11B illustrate processes in the center alignment and a resultant upstream signal to be transmitted, respectively.

FIG. 11A illustrates the process in the center alignment by the arranger 70 included in the communication terminal 18b. The center alignment is performed in the respective terminals 18a to 18n. The calculator 74 included in the communication terminal 18b first multiplies the transmission rate of the optical communication line 16 by the period of transmittable time recorded in the GATE message to thereby calculate an allocation grant size $M_2$.

Thereafter, the calculator 74 calculates a period of time required for transmitting data packets Pb that can be arranged in an allocation grant of the calculated size $M_2$. In this exemplified process, data packets Pb1, Pb2 and Pb3 can be arranged in the allocation grant of the size $M_2$.

Next, the calculator 74 subtracts the calculated time period required for the transmission from the transmittable time period recorded in the GATE message to thereby calculate a period of difference time d. Further, the calculator 74 divides the calculated difference time period d by two to thereby calculate the half period of the difference time, which is represented by $d_{1/2}$.

Then, the arranger 70 arranges in the allocation grant of the calculated size $M_2$ the data packets Pb from the time obtained by adding the period of time $d_{1/2}$ to the transmittable start time $T_{2S}$.

In this example, the allocation grant size $M_2$ is larger than the total of the data packets Pb1, Pb2 and Pb3 and smaller than that of the data packets Pb1, Pb2, Pb3 and Pb4. Thus, the arranger 70 in the communication terminal 18b arranges the data packets Pb1, Pb2 and Pb3 in the center alignment. Thus, the arranger 70 has arranged the data packets in the center alignment. The process described above is performed in the respective communication terminals 18 as well as the terminal 18b.

FIG. 11B shows communication signals to be transmitted from the communication terminals 18a and 18b, namely, resultant upstream signals flowing over the optical communication line 16.

Figure 12:
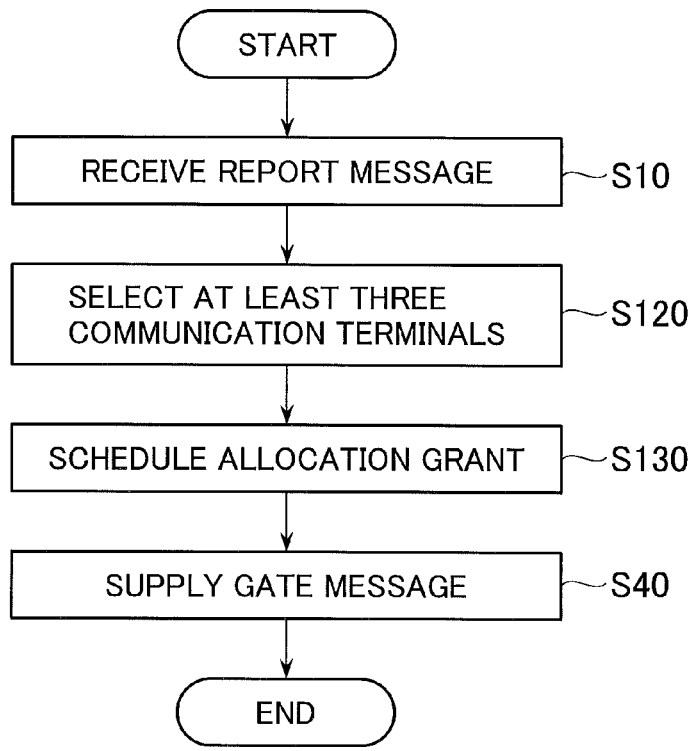
FIG. 12 is a flowchart, like FIG. 7, useful for understanding the operation for scheduling allocation grants by the bandwidth allocator in accordance with the alternative embodiment.
Figure 13:
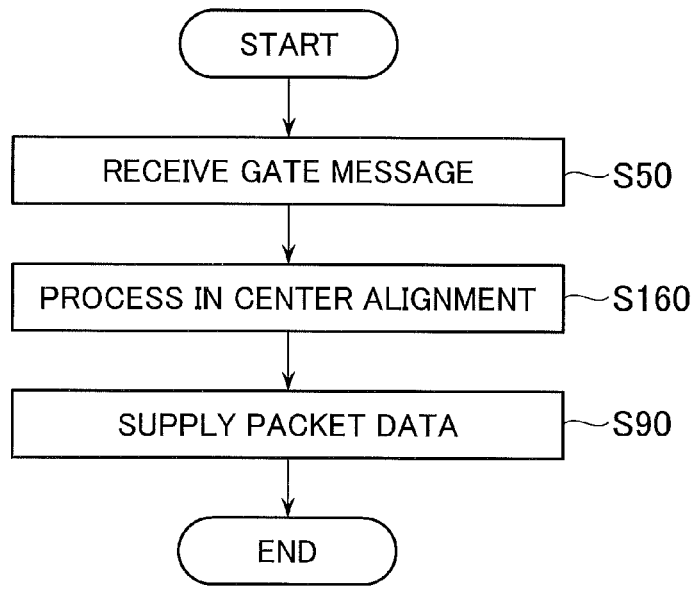
FIG. 13 is a flowchart, like FIG. 8, useful for understanding the operation for arranging data packets by the communication terminal in accordance with the alternative embodiment.

Reference will now be made to FIGS. 12 and 13 to describe the operation of the bandwidth allocating system 10 in accordance with the present alternative embodiment. First, the operation for scheduling the allocation grant 140 by the bandwidth allocator 12 will be described. Next, the operation for arranging the data packets by the communication terminal 18 will be described. Only the differences in operation from the previous embodiment will be described. Like components or steps are designated with identical reference numerals to avoid repetition in describing the operation.

FIG. 12 is a flowchart useful for understanding the operation for scheduling the allocation grants 140 by the bandwidth allocator 12. Subsequent to step S10, the selector 34 in the scheduler 26 selects at least three of the communication terminals 18 having received a REPORT message in step S10, and further sets those selected terminals as terminals performing communication in the n-th, (n+1)-th and (n+2)-th orders, or priorities of communication, where n is a natural number (step S120).

Then, the scheduler 26 schedules the allocation grant 140 so as to cause the last time period of the n-th allocation grant 140a to be allocated to overlap as a shared grant 150a with the top time period of the (n+1)-th allocation grant 140b to be allocated, and so as to cause the last time period of the (n+1) allocation grant 140b to be allocated to overlap as a shared grant 150b with the top time period of the (n+2)-th allocation grant 140c to be allocated (step S130).

The communication controller 32 records in a GATE message information on the allocation grant 140 scheduled in the step S130, and then transmits the GATE message to the communication terminals 18 in step S40.

FIG. 13 is a flowchart useful for understanding the operation for arranging data packets by the communication terminal 18. Following the step S50, the arranger 70 performs the center alignment for arranging data packets P stored in the data buffer 60 in the center alignment in an allocation grant 140 (step S160).

The communication controller 68 transmits in step S90 the data packets P to the optical communication line 16 according to the arrangement of the data packets P thus processed in the center alignment in step S160. The data packets P have thus been arranged by the communication terminal 18.

An example of an advantages caused by this alternative embodiment will be described with reference again to FIG. 10. Preconditions, computation expressions and the result of calculations described below are merely an example, and are changeable depending on operation environment.

The bandwidth usability Eff is represented by the following expression:

$$\mathit{Eff}(\alpha_1, \alpha_2, \ldots \alpha_{n-1}) = X(\alpha_1, \alpha_2, \ldots \alpha_{n-1}) \bigg/ \left( \sum_{i=1}^{n} M_i - \sum_{i=1}^{n-1} \alpha_i \right) \quad (4)$$

where the size of an allocation grant 140-$i$ is $M_i$ [byte], and the size of a shared grant located across the allocation grants 140-$i$ and 140-($i$+1) is $\alpha_i$ [byte], where i=1, 2, . . . , n, and n is equal to the total number of communication terminals 18.

It is to be noted that, where n=2, the expression (4) will be the expression (3) defined on the bandwidth usability Eff with the previous illustrative embodiment. Thus, the bandwidth allocating system 10 in accordance with this alternative embodiment can improve the bandwidth usability of the communication bandwidth of the optical communication line 16.

In summary, in the bandwidth allocating system 10 in accordance with the alternative embodiment, the bandwidth allocator 12 schedules an allocation grant 140 so as to cause both the top and last time periods of the allocation grant 140 to overlap as a shared grant 150 with the adjacent allocation grant thereof, thereby minimizing allocation loss that would otherwise be caused as an unused bandwidth.

While the present invention has been described above with reference to the particular illustrative embodiments, it is not to be restricted by the embodiments. It is to be appreciated that those skilled in the art can change or modify the embodiments without departing from the scope and spirit of the present invention. Some variations of the embodiments will be described below.

The shared grants 50 and 150 in the preferred embodiments can be set to have a predetermined time length equal therebetween. Alternatively, the shared grants can also be set to have a variable time length.

Figure 14:
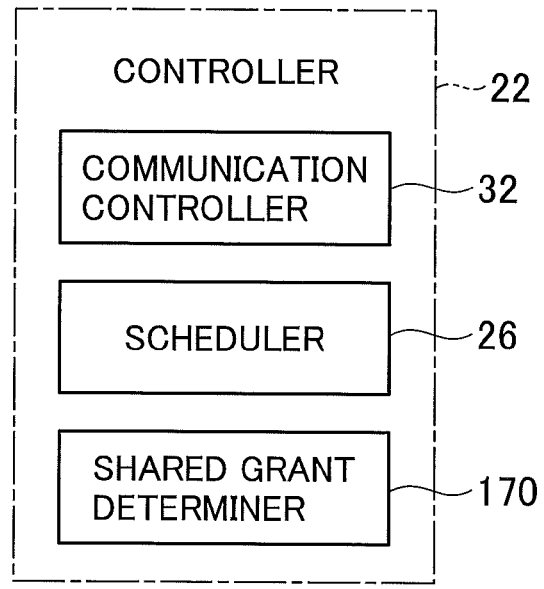
FIG. 14 is a schematic block diagram, like FIG. 2, showing an alternative configuration of the controller shown in FIG. 1.
Figure 15:
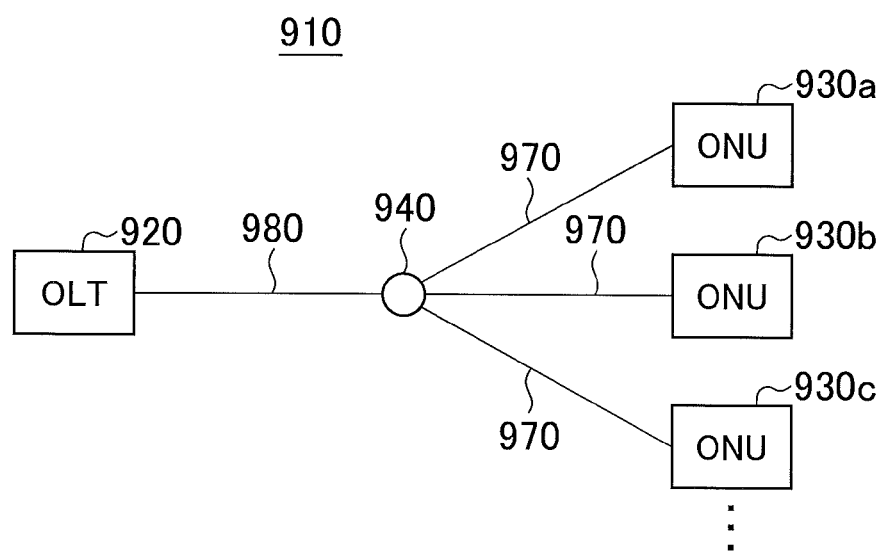
FIG. 15 is a schematic block diagram showing a configuration of a PON in a typical bandwidth allocating system.
Figure 16:
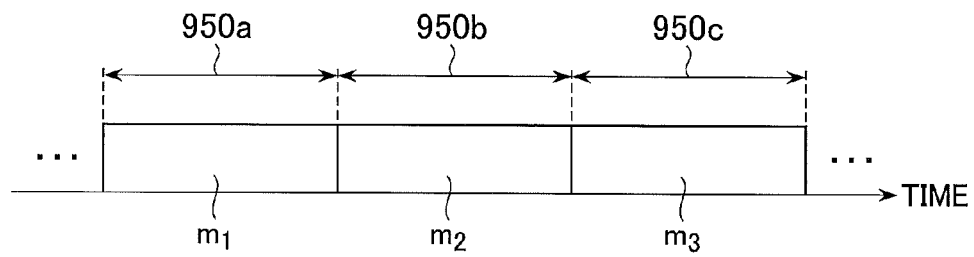
FIG. 16 is a schematic time chart useful for understanding a process for scheduling allocation grants by an OLT in the bandwidth allocating system shown in FIG. 15.
Figure 17:
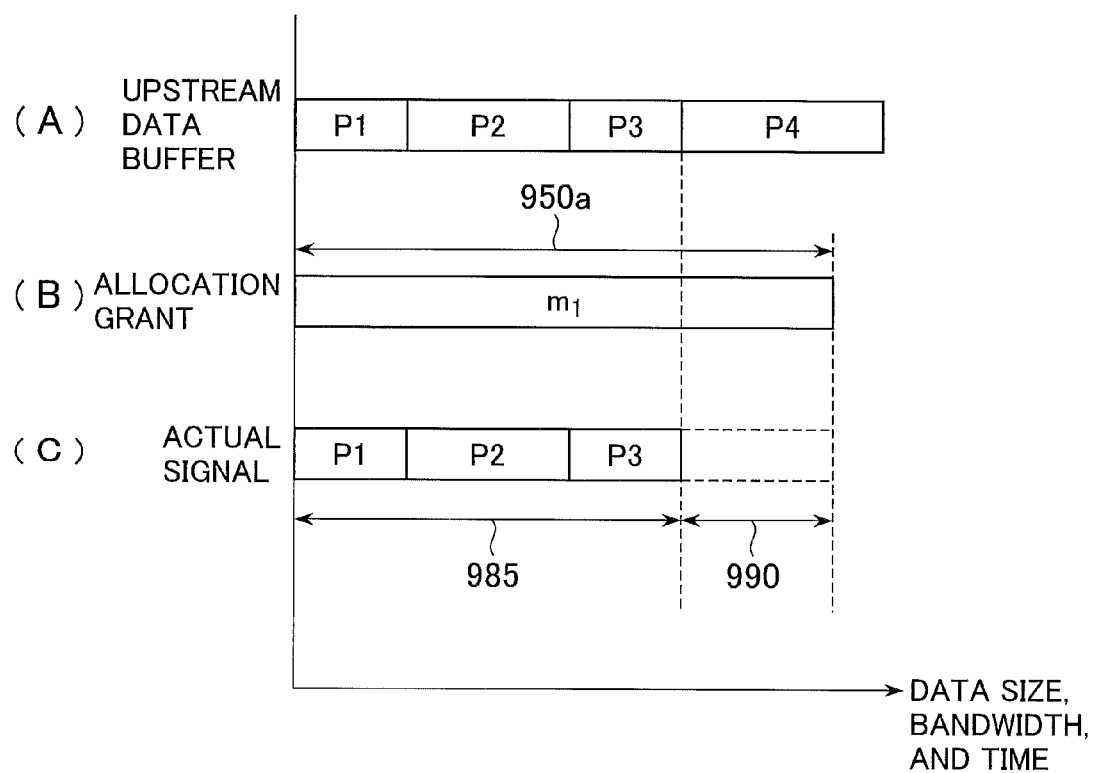
FIG. 17 is a schematic diagram useful for understanding a process for arranging data packets by an ONU in the bandwidth allocating system shown in FIG. 15.

The controller 22 in the illustrative embodiments may include, as shown in FIG. 14, a shared grant determiner 170 for defining the time length of a shared grant as such. The shared grant determiner 170 may define the time length of a shared grant, which the scheduler 26 will use to schedule an allocation grant. In that case, the shared grant determiner 170 may use, for example, the expression (3) or (4) to define the time length of a shared grant.

The entire disclosure of Japanese patent application No. 2010-192003 filed on Aug. 30, 2010, including the specification, claims, accompanying drawings and abstract of the disclosure, is incorporated herein by reference in its entirety.

What is claimed is:

1. A bandwidth allocator for use in a telecommunications network transmitting data packets to and from a plurality of communication terminals over a communication line, wherein the communication line has a bandwidth divided into a plurality of periods of time of a predetermined length, said bandwidth allocator comprising:
a controller controlling allocation of the bandwidth by using allocation grants for the plurality of periods of time for transmitting data,
wherein said controller includes a scheduler scheduling the allocation grants so as to cause one of the allocation grants to partially overlap as a shared grant with another of the allocation grants which is adjacent to said one of the allocation grants.

2. The bandwidth allocator in accordance with claim 1, wherein
said scheduler comprises a selector selecting any two of the plurality of communication terminals as a pair,
said selector sets one of the paired communication terminals as a first communication terminal communicating prior to another of the paired communication terminals, and sets the other communication terminal as a second communication terminal communicating next to the first communication terminal, and
said scheduler sets a time before a finish time of communication of the first communication terminal as a start time of communication of the second communication terminal, and then schedules the allocation grants so as to cause a last time period of a first allocation grant to be allocated to the first communication terminal to overlap as the shared grant with a top time period of a second allocation grant to be allocated to the second communication terminal.

3. The bandwidth allocator in accordance with claim 2, wherein
said controller further comprises a communication controller transmitting allocation grant information to the plurality of communication terminals, and
the allocation grant information includes the start time of communication, a period of transmittable time from the start time of communication to the finish time of communication, and shared-grant information on whether the shared grant is positioned in the top or last time period of the allocation grant.

4. The bandwidth allocator in accordance with claim 2, wherein said selector exempts, from the communication terminals that can be selected, a communication terminal having an allocation grant which corresponds to a data volume of a data packet required for transmission.

5. The bandwidth allocator in accordance with claim 1, wherein said scheduler comprises a selector selecting at least three of the plurality of communication terminals, and setting the selected communication terminals as communication terminals performing communication in an n-th, an (n+1)-th and an (n+2)-th priority, respectively, where n is a natural number, and
said scheduler sets a time before a finish time of communication of the communication terminal of the n-th priority as a start time of communication of the communication terminal of the (n+1)-th priority, and a time before a finish time of communication of the communication terminal of the (n+1)-th priority as a start time of communication of the communication terminal of the (n+2)-th priority, and then schedules the allocation grant so as to cause a last time period of an n-th allocation grant to be allocated to the communication terminal of the n-th priority to overlap as a first shared grant with a top time period of an (n+1)-th allocation grant to be allocated to the communication terminal of the (n+1)-th priority, and so as to cause a last time period of an (n+1)-th allocation grant to be allocated to the communication terminal of the (n+1)-th priority to overlap as a second shared grant with a top time period of an (n+2)-th allocation grant to be allocated to the communication terminal of the (n+2)-th priority.

6. The bandwidth allocator in accordance with claim 5, wherein
said controller further comprises a communication controller transmitting allocation grant information to the plurality of communication terminals, and
the allocation grant information includes the start time of communication, a period of transmittable time from the start time of communication to the finish time of communication, and shared-grant information that the first and the second shared grant are positioned in a first and a last time period, respectively, of the allocation grant.

7. The bandwidth allocator in accordance with claim 1, wherein
said controller further comprises a shared grant determiner determining a size of the shared grant so as to maximize a bandwidth usability of the communication line, and
said scheduler schedules the allocation grants to the communication terminal according to the size of the shared grant determined by said shared grant determiner.

8. The bandwidth allocator in accordance with claim 7, wherein said shared grant determiner calculates the size of the shared grant by using an expression (1):

$$Eff(\alpha_1, \alpha_2, \ldots \alpha_{n-1}) = X(\alpha_1, \alpha_2, \ldots \alpha_{n-1}) \bigg/ \left( \sum_{i=1}^{n} M_i - \sum_{i=1}^{n-1} \alpha_i \right) \quad (1)$$

where n is a total number of the plurality of communication terminals, $M_i$ is the size of the allocation grant, $X(\alpha_i)$ is an expectation value of a sum of the sizes of the data packets, $\alpha_i$ is the size of the shared grant, and $\text{Eff}(\alpha_i)$ is the bandwidth usability of the line.

9. The bandwidth allocator in accordance with claim 1, wherein the telecommunication network is an optical communication network.

10. A method of allocating a bandwidth in a bandwidth allocator for use in a telecommunications network transmitting data packets to and from a plurality of communication terminals over a communication line, wherein the communication line has a bandwidth divided into a plurality of periods of time of a predetermined length, said method comprising the steps of:
controlling allocation of the bandwidth by using allocation grants for the plurality of periods of time for transmitting data; and
scheduling the allocation grants so as to cause one of the allocation grants to partially overlap as a shared grant with another of the allocation grants which is adjacent to the one allocation grant.

11. The method in accordance with claim 10, further comprising the steps of:
selecting any two of the plurality of communication terminals as a pair;
setting one of the paired communication terminals as a first communication terminal communicating prior to another of the paired communication terminals, and setting the other communication terminal as a second communication terminal communicating next to the first communication terminal;
setting a time before a finish time of communication of the first communication terminal as a start time of communication of the second communication terminal; and
scheduling the allocation grants so as to cause a last time period of a first allocation grant to be allocated to the first communication terminal to overlap as the shared grant with a top time period of a second allocation grant to be allocated to the second communication terminal.

12. The method in accordance with claim 10, further comprising the steps of:
selecting at least three of the plurality of communication terminals;
setting the selected communication terminals as communication terminals performing communication in an n-th, an (n+1)-th and an (n+2)-th priority, respectively, where n is a natural number;
setting a time before a finish time of communication of the communication terminal of the n-th priority as a start time of communication of the communication terminal of the (n+1)-th priority, and a time before a finish time of communication of the communication terminal of the (n+1)-th priority as a start time of communication of the communication terminal of the (n+2)-th priority; and
scheduling the allocation grants so as to cause a last time period of an n-th allocation grant to be allocated to the communication terminal of the n-th priority to overlap as a first shared grant with a top time period of an (n+1)-th allocation grant to be allocated to the communication terminal of the (n+1)-th priority, and so as to cause a last time period of an (n+1)-th allocation grant to be allocated to the communication terminal of the (n+1)-th priority to overlap as a second shared grant with a top time period of an (n+2)-th allocation grant to be allocated to the communication terminal of the (n+2)-th priority.

13. A communication terminal for use in a telecommunications network transmitting data packets over a communication line to and from a bandwidth allocator controlling bandwidth allocation of the communication line, wherein the communication line has a bandwidth divided into a plurality of periods of time of a predetermined length, said communication terminal comprising:
a communication controller receiving allocation grant information on an allocation grant, the allocation grant identifying any of the plurality of periods of time for transmitting data during which the bandwidth allocator allows said communication terminal to use the communication line; and
an arranger to arrange the data packets,
wherein the allocation grant information includes shared-grant information on a shared grant that is a time period in which one of the allocation grants partially overlaps with another of the allocation grants which the bandwidth allocator allows to use the communication line; and
wherein the arranger arranges data packets in a time period other than the shared grant in the allocation grant, and thereafter arranges data packets in a time period of the shared grant.

14. The communication terminal in accordance with claim 13, wherein
the allocation grant information includes a start time of communication, a period of transmittable time from the start time of communication to a finish time of communication, and the shared-grant information on the shared grant representing whether the shared grant is positioned in a top or a last time period of the allocation grant,
said arranger comprises a detector detecting whether the shared grant is positioned in the top or the last time period of the allocation grant, and a calculator calculating a required period of transmission time required for transmitting data packets capable of being transmitted in the period of transmittable time and further a period of difference time obtained by subtracting the required period of transmission time from the period of transmittable time,
when said detector determines that the shared grant is positioned in the last time period of the allocation grant, said arranger arranges the data packets in left alignment in an order closely from the start time of communication, and
when said detector determines that the shared grant is positioned in the top time period of the allocation grant, said calculator calculates the period of difference time, and further said arranger arranges the data packets in right alignment in the order closely from a time obtained by adding the period of difference time to the start time of communication.

15. The communication terminal in accordance with claim 13, wherein
the allocation grant information includes a start time of communication, a period of transmittable time from the start time of communication to a finish time of communication, and the shared-grant information on the shared grants represents that the shared grants are positioned in a top time period and a last time period as the first and second shared grants, respectively, of the allocation grant,
said arranger comprises a calculator calculating a required period of transmission time required for communication for data packets capable of being transmitted in the period of transmittable time, and further a half period of difference time obtained by dividing by two a period of difference time obtained by subtracting the required period of transmission time from the period of transmittable time, and said arranger arranges the data packet in center alignment in the order closely from a time obtained by adding the half period of difference time to the start time of communication.

16. The communication terminal in accordance with claim 13, wherein the telecommunication network is an optical communication network.

* * * * *